Jan. 2, 1934. B. J. CAREY 1,942,275
AGITATOR FOR SIFTERS
Filed March 30, 1932 2 Sheets-Sheet 1

B. J. Carey, INVENTOR
BY Victor J. Evans & Co.
ATTORNEY

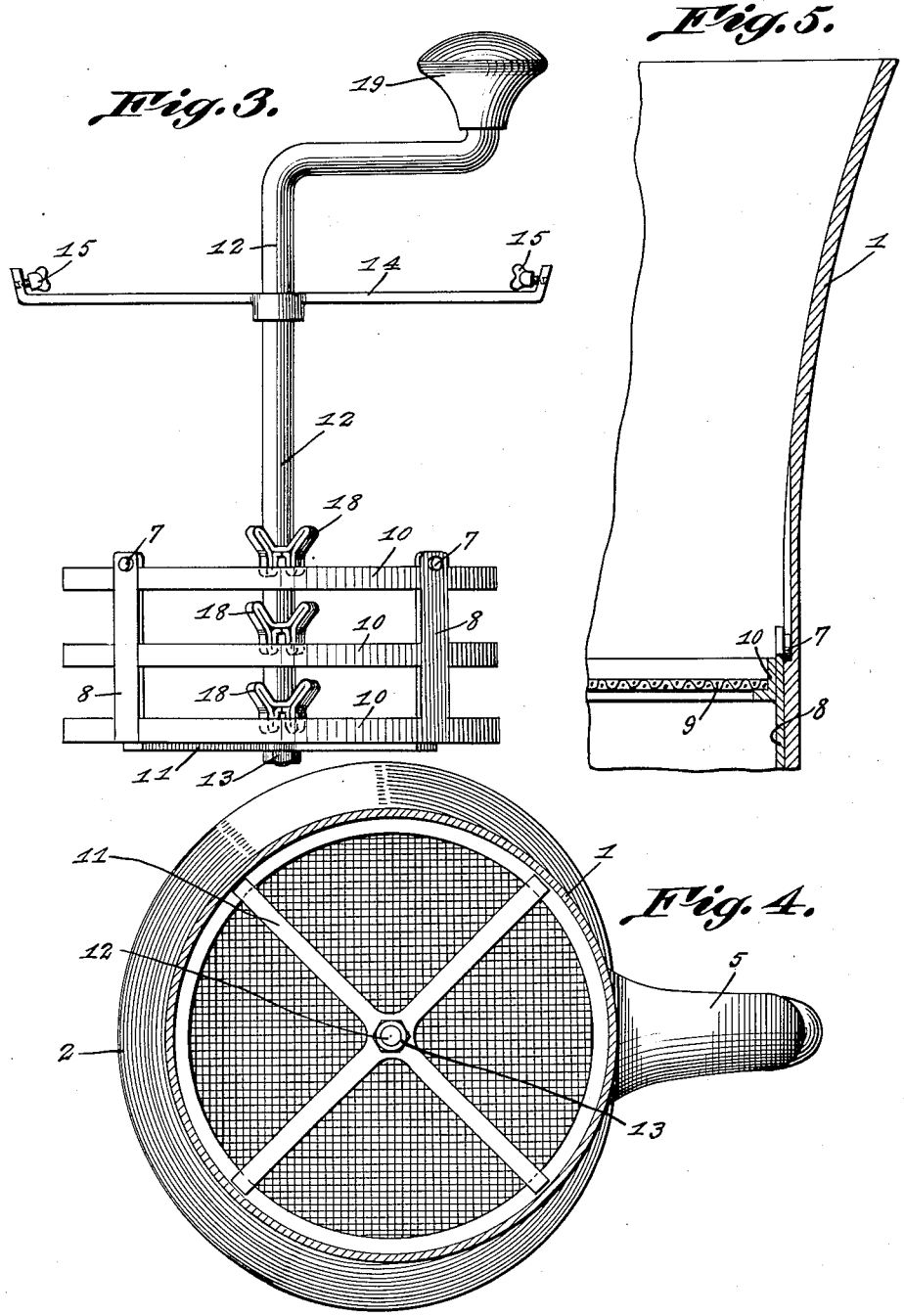

Patented Jan. 2, 1934

1,942,275

UNITED STATES PATENT OFFICE 1,942,275

AGITATOR FOR SIFTERS

Bartholomew James Carey, Genesee, Idaho

Application March 30, 1932. Serial No. 602,083

1 Claim. (Cl. 209—355)

My present invention has reference to a kitchen utensil and is in the nature of a flour sifter. Among the objects of my invention is the provision of a flour sifter whose body is formed to provide the mouth thereof with a scoop so that flour may be readily scooped into the body, to form the open bottom with an inner tapered or conical portion which may be arranged over a cup or the like in which the sifted flour is delivered, to provide a plurality of superimposed sifting screens of different mesh connected together to hold the same in proper spaced relation one over the other, and said connecting means having elements for engaging with the body for holding the screens from movement, to provide the device with either a manually operated or motor driven shaft that passes centrally through the screens and which has mounted thereon agitators of a particular and peculiar construction, one of each of said agitators being arranged over the respective screens and being susceptible to vertical movement on the shaft and to likewise associate the shaft, agitators and screens with the receptacle in a manner whereby the sifting device may as a unit be removed from the said receptacle.

To the attainment of the foregoing the invention consists in the improvement hereinafter described and definitely claimed.

In the drawings:

Figure 3 is a plan view of the screening device removed from the receptacle or vessel.

Figure 4 is a sectional view approximately on the line 4—4 of Figure 1, looking in the direction of the arrows.

Figure 5 is a detail enlarged sectional view to illustrate the manner in which the screening discs are removably supported in the vessel or receptacle.

Figure 1:
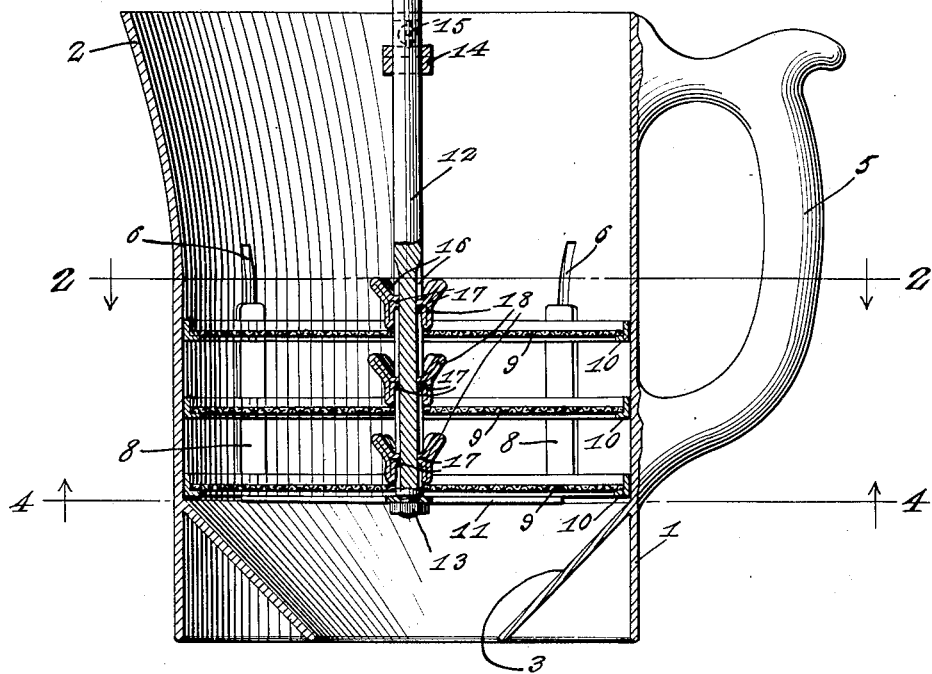
Figure 1 is an approximately central vertical transverse sectional view through the improvement.
Figure 2:
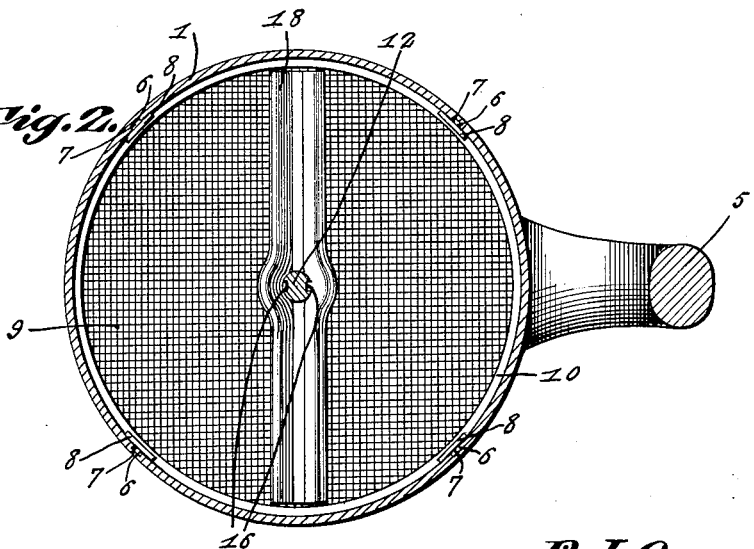
Figure 2 is a horizontal sectional view approximately on the line 2—2 of Figure 1, looking in the direction of the arrows.

The major portion of the vessel or receptacle 1 is round in cross section, being open at both its top and bottom, but from the said rounded portion the vessel is outwardly rounded along its side and its front to provide the same with a scoop 2. The vessel is integrally formed at a suitable distance from its open bottom with an inner downwardly tapered or flared part 3 that affords an outlet for the sifted flour.

Opposite the scoop 2, at the mouth of the vessel, the latter is formed with a handle 5, and the vessel at the juncture of the flared or outwardly rounded portion and the straight portion thereof is provided with equidistantly spaced longitudinally extending grooves 6. The grooves are preferably four in number and are arranged at a right angle with respect to each other. These grooves are designed to receive therein lugs 7 formed on the combined brace and connecting plates 8 for superimposed screening discs 9, respectively. The screening discs are provided with rims 10 to which the plates 8 are secured and the rim on the under face of the lower screening disc is reinforced by a spider 11. If desired, such spiders may be arranged on the under face of all of the screening discs. The mesh of the top screening disc is comparatively coarse, the mesh of the next disc being finer and the mesh of the lower disc being still finer. The discs are centrally provided with round openings which may be suitably reinforced and these openings aline with the central opening in the spider 11. There is passed through these alining openings a shaft 12. The lower end of the shaft is threaded and has screwed thereon a nut 8. The shaft passes through an opening in a bearing plate 14 which has angle ends through which pass removable securing elements 15 (Figure 3). The securing elements are preferably in the nature of wing bolts which may pass through threaded openings in the vessel 1 or which may bind against the inner wall of said vessel. The shaft 12, at the portion thereof that passes through the screening discs and for a suitable distance above the uppermost screening disc, is provided with oppositely disposed longitudinally extending grooves 16 that receive therein lugs 17 provided in the central bores of cross sectionally Y-shaped agitators 18, one of such agitators resting on each of the screening discs.

The outer end of the shaft 12 is cranked and in the showing of the drawings is provided with a revoluble knob or handle 19. When the screen is of large proportion and is employed for screening a greater quantity of flour the shaft 12 may be motor driven.

The screening discs are held from movement but the turning of the shaft 12 causes the cross sectionally Y-shaped agitators to revolve around the discs. Because of the particular and peculiar shape of the agitators the flour will crowd between the depending lower portions of said agitators and the upper and outwardly extending angle portions thereof so that all of the flour will be positively directed by the agitators through the respective screens which materially assists in the screening operation. By partly removing the elements 15, the screening device as a whole may be removed from the vessel and the screening discs may be singly cleaned by a suitable brush.

It is believed that when the foregoing description has been carefully read in connection with the accompanying drawings the advantages of the construction will be understood and appreciated by those skilled in the art to which the invention relates so that further detailed description will not be required.

Having described the invention, I claim:

A flour screen including a tubular vessel having its sides and its front curved outwardly from the back to the front thereof and the curved portion, at the juncture of the straight portion of the vessel having rightangularly arranged grooves therein, an integrally formed funnel-shaped bottom in the vessel, a plurality of screening discs, each of a different mesh and each provided with a rim, plates secured to the rims and spacing the discs, lugs on the plates to be received in the grooves of the vessel, a reinforcing spider on the under face of the lower disc, a shaft passing centrally through the discs and spider and removably secured to the latter, a removable bearing plate on the vessel for the shaft and said shaft having an upper angle end provided with a revoluble handle, the lower end of the shaft having oppositely disposed longitudinally extending grooves, agitator blades having inwardly extending lugs to be received in the grooves, said blades resting on the respective discs, said blades being substantially Y-shaped in cross section and the rear of the vessel being provided with a handle.

BARTHOLOMEW JAMES CAREY.